April 27, 1937.  L. M. MYERS  2,078,771

VOLTAGE MEASURING APPARATUS

Filed April 25, 1935

INVENTOR
LEONARD M. MYERS
BY
ATTORNEY

Patented Apr. 27, 1937

2,078,771

UNITED STATES PATENT OFFICE 2,078,771

VOLTAGE MEASURING APPARATUS

Leonard Morris Myers, Middlesborough, England, assignor to Radio Corporation of America, a corporation of Delaware Application April 25, 1935, Serial No. 18,268
In Great Britain May 28, 1934

9 Claims. (Cl. 171—95)

This invention relates to voltage measuring apparatus and has for its object to provide an improved voltage measuring apparatus suitable for use for measuring very high voltages.

According to this invention a voltage measuring apparatus comprises a source of light; a light polarizer (e. g. a Nicol prism) a lamina of quartz or the like electro-optical active material of small thickness in the direction of its electrical axis and cut from a right handed optically active crystal; a like lamina of quartz or the like cut from a left handed optically active crystal; a Fresnel wedge arrangement or the like (i. e. a bi-quartz consisting of two oppositely handed wedges); a light analyzer (e. g. a second Nicol prism) which is crossed with the polarizer (the optical devices so far mentioned being placed in the order stated in the light beam from the source); and electrode plates associated with the upper and lower faces of the quartz laminae; the whole optical system being adjusted and arranged to give a black band crossing the emergent beam from the analyzer.

With an arrangement as above described the result of applying potential difference to the two electrodes will be to cause the black band to move across the visible field and its movement will be proportional to the applied potential difference.

Any convenient means may be provided for reading an instrument as above described; for example an image of the beam may be projected on to a translucent screen having a graded scale marked thereon or optically projected thereon. Alternatively (for a laboratory instrument) means may be provided for bringing the black band back to its original position after it has been deflected by the application of a voltage to be measured, said means comprising means for providing relative movement between the wedges of the Fresnel wedge arrangement may be mounted upon carriers one of which is controlled in position by a suitably calibrated micrometer screw, and it will be appreciated that the movement of this screw necessary after a voltage to be measured has been applied, to bring back the black band to the position which it had before that voltage was applied, will be a measure of that voltage.

Again, where a laboratory instrument is in question it will often be quite convenient to "read" the image by means of a reading telescope provided with a scale.

In practice the thickness of the quartz laminae in the direction of the electrical axis may be of the order of a millimetre or so, and its dimensions in a plane perpendicular to this axis may be as convenient—say from 2 to 6 centimetres.

Quartz laminae of 1 millimetre thickness and arranged as described above may be employed for measuring voltage differences of the order of 30,000 volts. If it be desired to measure still higher voltages mica or similar sheets may be placed on each face of the quartz and the electrodes mounted on the outer surfaces of the mica or the like the thickness of the mica or the like being sufficient to cause the potential difference obtained at the surfaces of the quartz when a maximum voltage is applied to the electrodes to be such as will give a full scale deflection.

The invention is illustrated in the accompanying drawing of which Fig. 1 is an embodiment of the invention to be used with a telescope.

Figure 1:
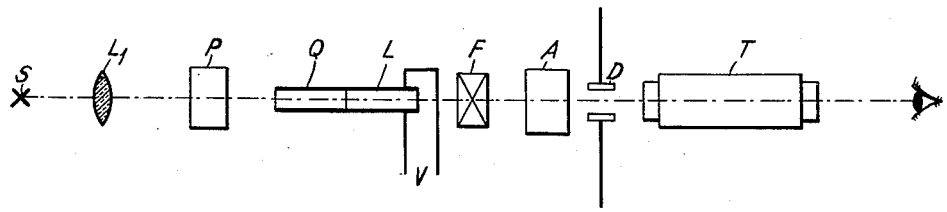
Figure 2:
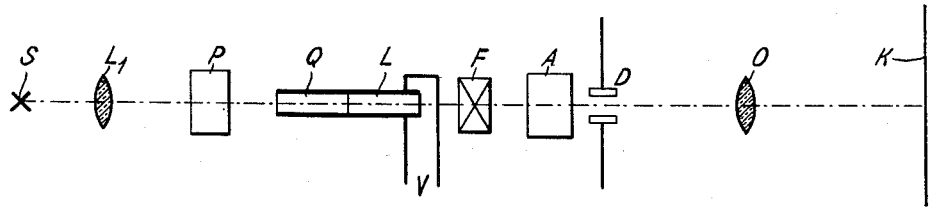
Fig. 2 shows a modification of the embodiment of the invention utilizing a screen for observation.
Figure 3:
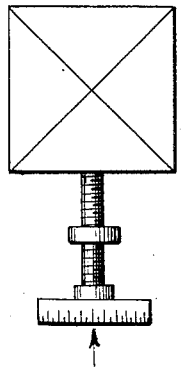
Fig. 3 shows the adjustable Fresnel wedge arrangement schematically.

Referring to Figure 1 light from a source S is collected and collimated by a suitable lens system $L_1$ the emergent parallel light from which passes through a polarizer P which may, for example, be a simple block of calcite after which the light passes through two quartz laminae QL cut from oppositely handed optically active crystals. F is a Fresnel double wedge compensator behind which is an analyzer A which may also be a simple block of calcite similar to the polarizer P and disposed with principal planes parallel to the polarizer. D is a screen having a horizontal slit positioned to cut off the image due to the extraordinary rays. The voltage to be measured is applied between upper and lower electrodes on the quartz laminae. T is a telescope. The arrangement is such that with white light from the source S and in the absence of applied voltage a central dark wedge is seen in the field of the telescope which is focused for parallel light. Upon application of voltage to the quartz this wedge or central band shifts, at the same time becoming less well defined, the shift being due to the modification of the rotary power of the quartz and the diminution of definition being due to the modification in double refraction. It may be shown that the total retardation is the square root of the sum of the squares of the retardation due to rotation and that due to double refraction and, therefore, compensation for retardation due to rotation can be effected by shifting one wedge of the Fresnel double wedge over the other. A graduated micrometer screw or equivalent arrangement (not shown) is provided for thus causing relative movement between the wedges and it will be seen that the movement necessary to overcome the shift due to an applied voltage will be a direct measure of that voltage. The micrometer screw is calibrated with the aid of known voltages and the calibrated instrument thus constitutes a voltmeter.

For projection purposes the arrangement of Figure 1 may be modified by replacing the telescope T by a projection objective O which throws the dark line on a calibrated scale or screen K the shift of the line on this screen for any applied voltage giving the measure of that voltage.

Having now particularly described and ascertained the nature of my said invention and in what manner the same is to be performed, I declare that what I claim is:—

1. A voltage measuring or indicating device comprising a source of light, a polarizer for said light, a pair of laminae of quartz interposed in succession in the path of the polarized light, said laminae being cut from oppositely handed active crystal, means for applying voltage to be measured or indicated between the upper and lower faces of the laminae, a Fresnel wedge arrangement positioned in the path of the light from the second laminae, and an analyzer crossed with said polarizer and positioned in the path of the light from the Fresnel wedge arrangement, the whole arrangement being such as to give a black band crossing the emergent beam of the analyzer, said band shifting when voltage to be measured or indicated is applied.

2. A voltage measuring or indicating device comprising a Nicol prism, a lamina of quartz of small thickness in the direction of its electrical axis and cut from a right handed optically active crystal, a like lamina of quartz cut from a left handed optically active crystal, a bi-quartz consisting of two oppositely bended wedges, a second Nicol prism which is crossed with the polarizer, said aforementioned optical devices being placed in the order stated in the light beam from the source, and electrode plates associated with the upper and lower faces of the quartz laminae, the whole optical system being adjusted and arranged to give a black band crossing the emergent beam from the analyzer.

3. A device as claimed in claim 1 wherein the polarizer and analyzer are constituted by blocks of calcite.

4. A device as claimed in claim 1 wherein the light emerging from the analyzer is passed through an apertured member positioned and arranged to cut off the extraordinary ray image.

5. A device as claimed in claim 1 wherein the elements of the Fresnel wedge arrangement are adjustable with respect to one another.

6. A device as claimed in claim 1 wherein the elements of the Fresnel wedge arrangement are adjustable with respect to one another by calibrated adjustment means, whereby a zero reading instrument is obtained.

7. A device as claimed in claim 1 comprising means for projecting the emergent light, across which is the black band, upon a calibrated scale or screen.

8. The method of measuring potentials comprising the steps of producing a beam of polarized light, directing said beam through a plurality of double refracting bodies of opposite rotation, producing a black band on the white field of the emergent light, supplying the potential to be measured to the opposite faces of one of the double refracting bodies, and deflecting said black band in proportion to the applied potential.

9. In an optical system wherein is provided means for producing a black band on a white field of emergent polarized light, the method of deflecting said black band by electro-statically changing the properties of a plurality of double refracting bodies of opposite rotations.

LEONARD MORRIS MYERS.